United States Patent [19]
Schrafft

[11] 3,764,145
[45] Oct. 9, 1973

[54] SPACE TRAVEL GAME USING MAGNETS TO SIMULATE THE PULL OF GRAVITY

[75] Inventor: Frederick E. Schrafft, Old Lyme, Conn.

[73] Assignee: The Raymond Lee Organization Inc., New York, N.Y.

[22] Filed: Oct. 19, 1972

[21] Appl. No.: 298,853

[52] U.S. Cl. ........... 273/131 AD, 35/19 R, 46/240, 273/1 M, 273/131 BB, 273/134 AE, 273/134 AA
[51] Int. Cl. ............................................. A63f 3/00
[58] Field of Search .......... 273/1 M, 134 R, 134 A, 273/134 AE, 134 AA, 135 R, 135 A, 135 AD, 135 AB, 131 R, 131 A, 131 AD, 131 BB; 46/240; 35/19 R, 19 A

[56] References Cited
UNITED STATES PATENTS

| 1,225,787 | 5/1917 | Diehl | 273/1 M UX |
| 1,988,071 | 1/1935 | Bryn | 273/1 M UX |
| 2,975,551 | 3/1961 | Oberinger | 273/1 M X |
| 2,995,372 | 8/1961 | Hines | 46/240 X |
| 3,214,171 | 10/1965 | Luchsinger | 46/240 X |
| 3,658,338 | 4/1972 | Wheelock | 273/134 AE |

Primary Examiner—Richard C. Pinkham
Assistant Examiner—Paul E. Shapiro
Attorney—Richard S. Shreve, Jr.

[57] ABSTRACT

A game comprising a first flat horizontal rectangular non-magnetic sheet; first and second ring magnets overlying the first sheet and disposed adjacent opposite ends; first and second disc magnets disposed in the centers of the corresponding first and second ring magnets; a second horizontal non-magnetic sheet overlying the magnets; at least one magnetic body lying movably on the top of the second sheet; a third horizontal non-magnetic sheet disposed above the magnetic body; and at least one bar magnet slidable along the third sheet.

4 Claims, 7 Drawing Figures

PATENTED OCT 9 1973　　　　　　　　　　　　　　　3,764,145
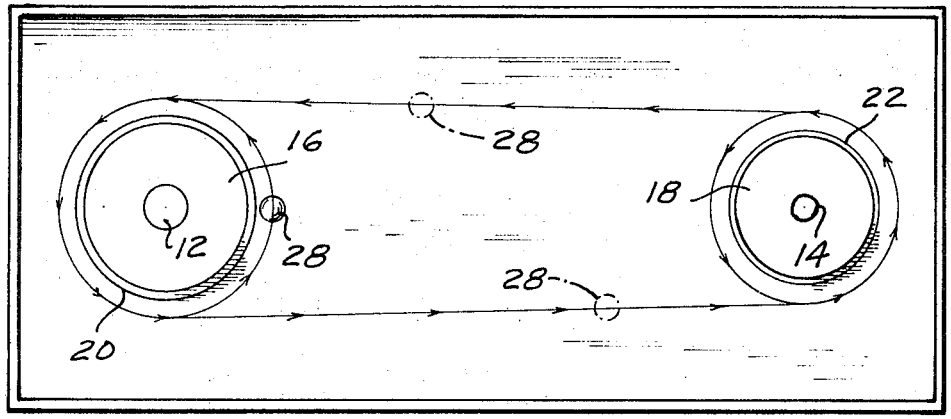
FIG. 1
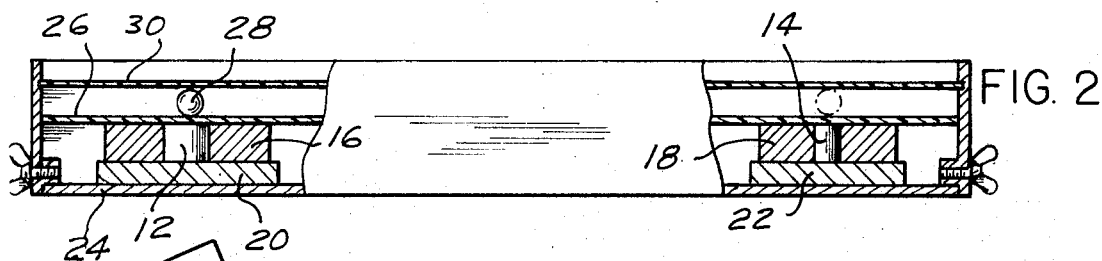
FIG. 2
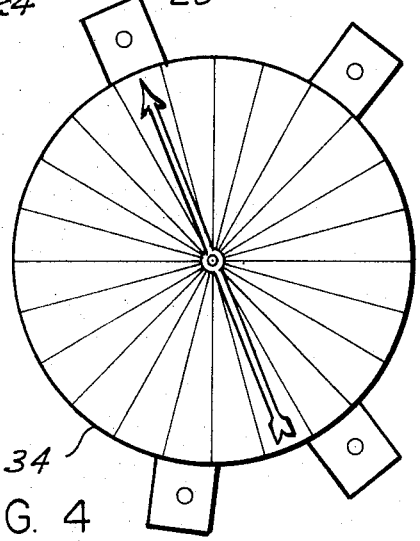
FIG. 4
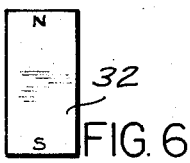
FIG. 5
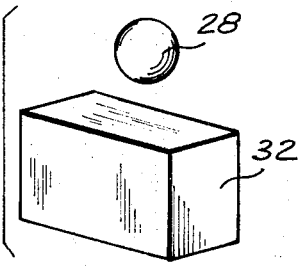
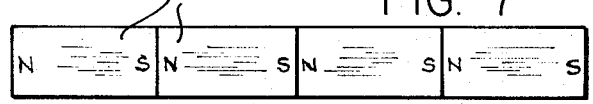
FIG. 6　　FIG. 7
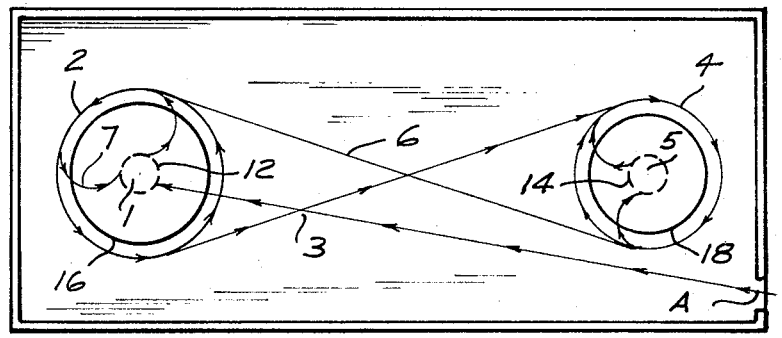
FIG. 3

SPACE TRAVEL GAME USING MAGNETS TO SIMULATE THE PULL OF GRAVITY

SUMMARY OF THE INVENTION

My invention is directed toward a game for teaching the principles of space travel including such concepts as gravity, earth pull, moon pull and the like.

I employ a pair of spaced disc magnets on a flat surface. Each magnetic has a magnetic field which represents the gravitational pull of planets and moons such as the Earth and the Moon. Each disc magnet is surrounded by a spaced ring magnet having a field which defines an orbit around the simulated planet or moon. A second non-magnetic surface overlies the magnets and supports at least one movable magnetic body. A third like surface is disposed above the body. At least one bar magnet is slidable on the third surface. The body or bodies can then be manipulated by interacting magnetic fields to illustrate the various concepts in the framework of games as described below.

BRIEF DESCRIPTION OF THE DRAWINGS

In the drawings:

FIG 1 is a plan of the main structure used in my invention;

FIG 2 is a cut away side elevation of the structure of FIG 1;

FIG 3 is a plan of the structure of FIG 1 illustrating the use thereof;

FIG 4 shows a spinner used in my invention;

FIGS 5 and 6 are different views of magnet and sphere used in my invention; and

FIG. 7 is a plan of space capsule representing magnets used in my invention.

DETAILED DESCRIPTION OF PREFERRED EMBODIMENTS

A hollow elongated container has two spaced disc magnets 12 and 14 disposed adjacent each end and lying flat on corresponding horizontal bottom plastic plates 20 and 22. Magnets 12 and 14 are disposed at the centers of ring magnets 16 and 18. Each plate with its corresponding disc and ring magnets can be removed and replaced onto support plastic sheet 24 to permit use of magnets of like geometry but different field strengths.

A flat transparent plastic sheet 26 overlies the magnets. One or more magnetic balls 28 are disposed rotatably on top of sheet 26. A second parallel sheet 30 overlies sheet 26 and is spaced above balls 28. Each ball can be controlled by a separate bar magnet 32 slidable along the top of sheet 30.

Each disc can represent by its magnetic pull the gravity of planet or moon. For example discs 12 and 14 can represent Earth and Moon respectively. Each ring magnet establishes by its pull the orbital path around the particular planet or moon. Thus magnets 16 and 18 represent orbits around Earth and Moon. Substitution of magnets can enable other planets or moons to be represented.

Each ball 28 can represent a spaceship and each magnet 34 can represent a mission control crew. A game then known as Voyage to the Planets can be played. Object of the game is to get the SPACESHIP onto the launching pad, out into ORBIT of the Earth, then into space travel for the trip to the Moon, into ORBIT of the Moon and the landing on the Moon. The return trip is into moon ORBIT, space travel, Earth ORBIT and back to the landing on Earth.

To start, push a ball thru the hole marked "A", and place the magnet on the plastic sheet directly over the ball. The player will feel the Mission Control Crew take over control of the Spaceship. Control the direction you wish your Spaceship to go by holding the magnet between your thumb and forefinger, and leading the ball where you want it to go.

Once a player has control of the ball, try to get it thru the Earth's magnetic ORBITAL field, to the DIRECT center of the Earth, where it will be held by the GRAVITY of Earth. When this position is reached, a player should try to get the ball into an ORBIT of the Earth, where it will again be held by the magnetic Zone of the Earth.

He makes as many orbits of the Earth as needed to get the ball into free space for the trip to the moon. Once into space travel, he leads his ship to the Moon for the ORBIT around the Moon. Again make as many ORBITS as are needed to break out of the Moon's LESSER magnetic ORBITAL field for the landing on the CENTER of the Moon, where it will be held by Moon's lesser GRAVITY.

The return trip is in reverse order for the trip back to Earth and the landing on the CENTER of Earth. The player making the complete trip in the least time is the winner. Should a player lose control of his SHIP (ball) at any time, it means he is LOST in outer space and must start all over again.

While it will seem impossible at first, the trip can be made without mishap by careful control of the ball at all times. Due to the lesser magnetic PULL of the magnets used in the Moon field (one/sixth those of Earth) most players tend to lose control for this reason.

FIG 3 shows the various positions described above identified as 1 through 7 respectively. By substituting bar magnets A, B, C and D for balls 28 and using a spinner control dial 34 another game called Journey to the Moon. The magnets A, B, C and D are colored red, white, blue and yellow respectively.

Object of the game is for each Mission Control Crew to try and get their Spacecraft from Earth to the Moon and back. First spacecraft to reach Splashdown (position twenty) being the winner.

The mission Control Dial has 24 spaces, being numbered from one to 20 to correspond to twenty positions on the playing field, four spaces numbered one to give each crew an equal chance to reach the Launch pad (position one), and the final space lettered "GO." The "GO" space is the All Systems Go space which means that all SPACECRAFT move forward one position whenever the Red pointer stops on that space.

To start the game all players spin the pointer. High man is first, etc.

Number one player puts his Mission Control Crew on space No. 1 as shown on Control Dial. He then spins the pointer trying to get it to stop on his number or the GO space. Should he succeed he then moves his Spacecraft to position one on the playing field and his control crew to space two on the control dial. He then spins again trying for space two or the GO space, and so on until he fails to get pointer point to stop on his chosen space or GO.

Second player now takes his turn and follows thru until he fails to get his number or the GO space. Other players follow in like fashion.

In the event a Spacecraft reaches a position already occupied by one Spacecraft, the last craft reaching that position must always go on the bottom. The lowest craft must always carry those above it on all moves made by it. The top craft is always free to leave alone should the play allow it, which is often the case. The Control Crews on the control dial must also follow this rule at all times. This holds true whenever there is two or more spacecraft on one position. To show how this rule applies let us say that it is RED'S turn to spin and he gets his number or the GO, he is free to leave as he is on top. Suppose however it was WHITE's turn to spin and he got his number or GO, he would have to take RED along with him until RED leaves when the play allows. This holds true for BLUE and YELLOW also as well as the Control Crews shown in diagram "C". In other words, what ever sequence the spacecraft are "stacked" on a position the control crews must be "stacked" also. This is the most important rule to remember as it is vital to the playing of this version of the game.

While I have described my invention with particular reference to the drawings, such is not to be considered as limiting its actual scope.

Having thus described this invention, what is assered as new is:

1. A game comprising:
a first flat horizontal rectangular non-magnetic sheet;
first and second ring magnets overlying the first sheet and disposed adjacent opposite ends;
first and second disc magnets disposed in the centers of the corresponding first and second ring magnets;
a second horizontal non-magnetic sheet overlying the magnets;
at least one magnetic body lying movably on top of the second sheet;
a third horizontal non-magnetic sheet disposed above the magnetic body; and
at least one bar magnet slidable along the third sheet.

2. The game of claim 1 wherein said body is a magnet.

3. The game of claim 1 wherein the body is a magnetic sphere.

4. The game of claim 1 wherein each ring magnet-disc magnet pair rests on a non-magnetic base which can be removed from the first sheet and replaced by another pair of like geometry but different magnetic strengths.

* * * * *